March 22, 1932.  E. G. WESSMAN  1,850,486
CAPPING MACHINE
Filed June 5, 1926  10 Sheets-Sheet 1

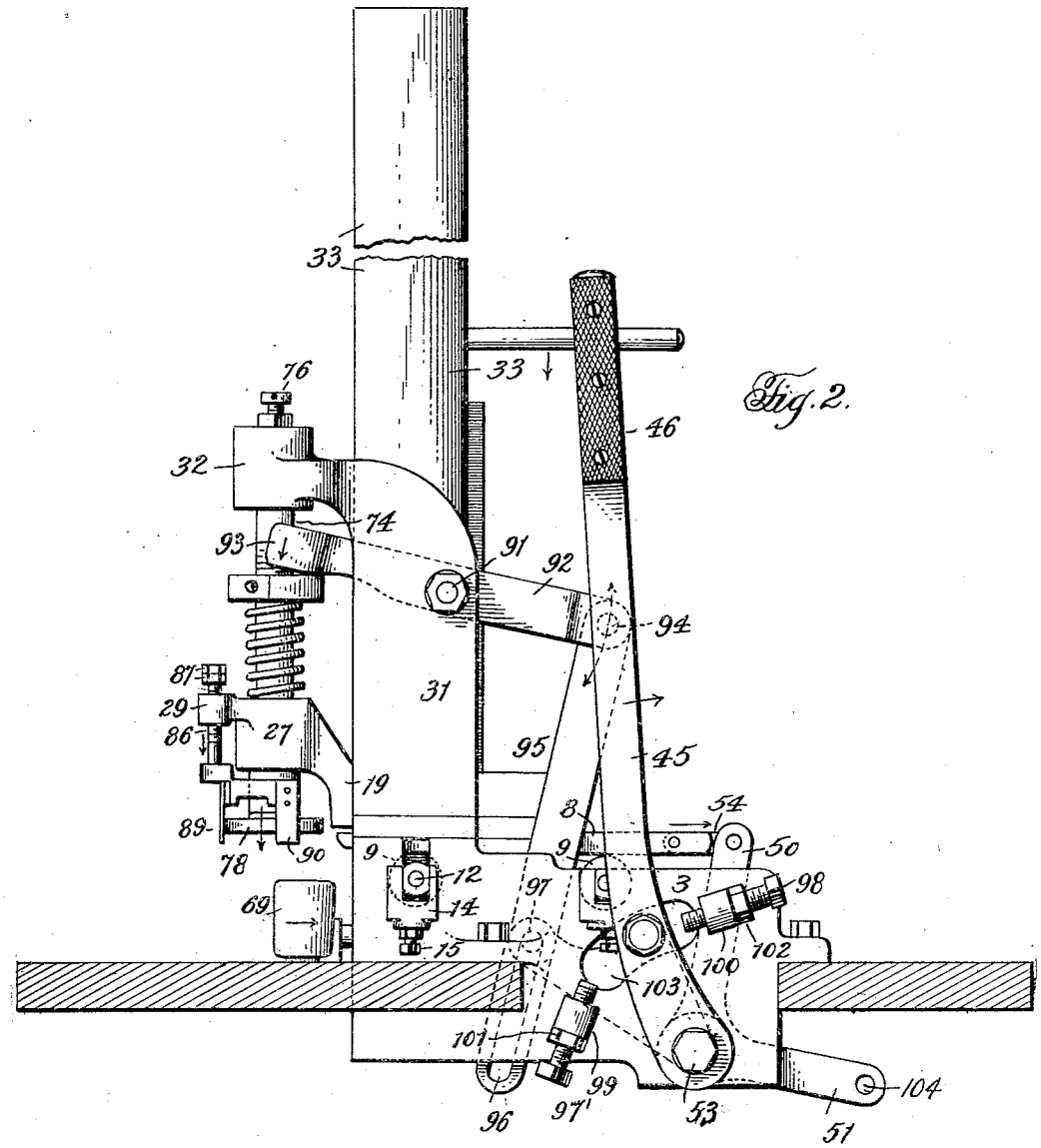

March 22, 1932. E. G. WESSMAN 1,850,486
CAPPING MACHINE
Filed June 5, 1926 10 Sheets-Sheet 3
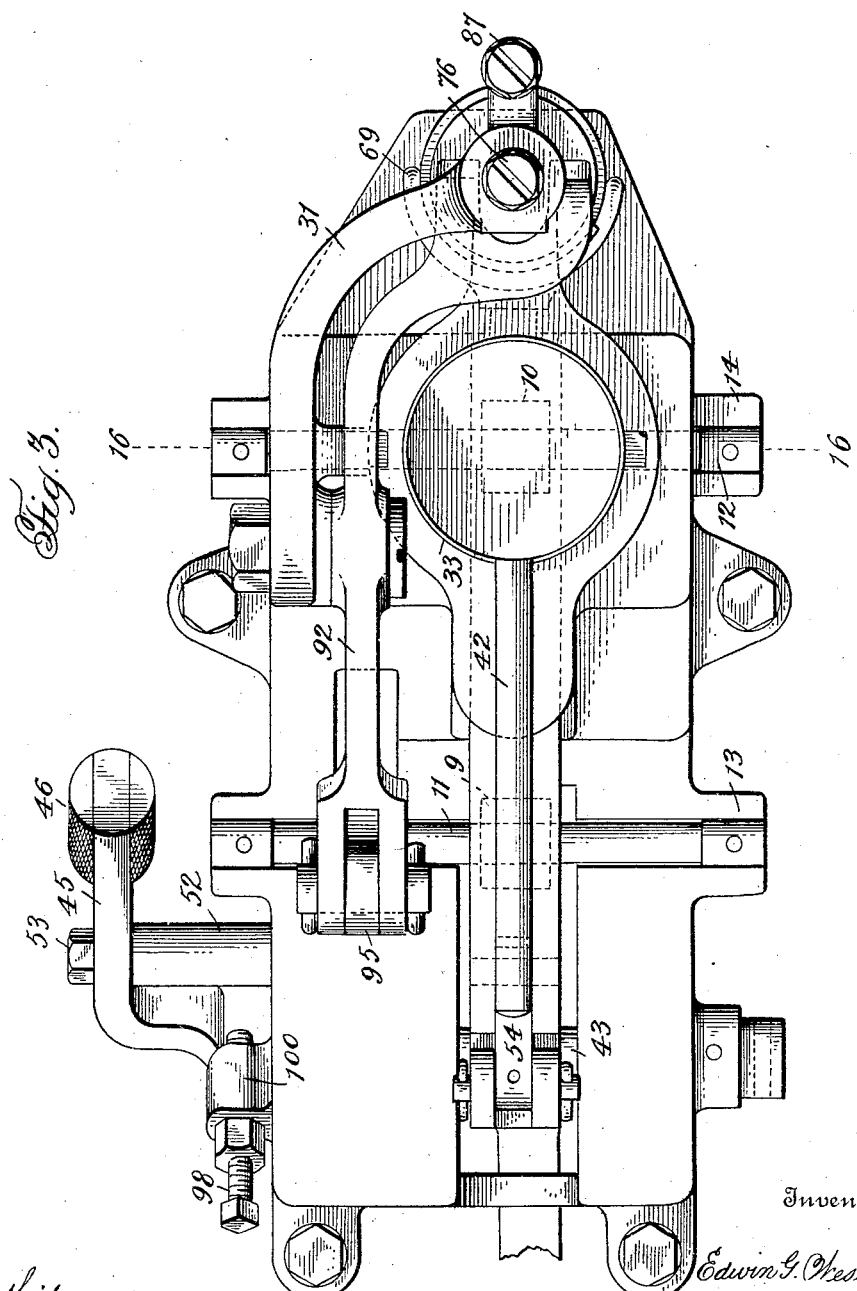
Inventor:
Edwin G. Wessman
Witness:
Jas. E. Hutchinson
By Milans & Milans Attorneys March 22, 1932.  E. G. WESSMAN  1,850,486
CAPPING MACHINE
Filed June 5, 1926  10 Sheets-Sheet 4
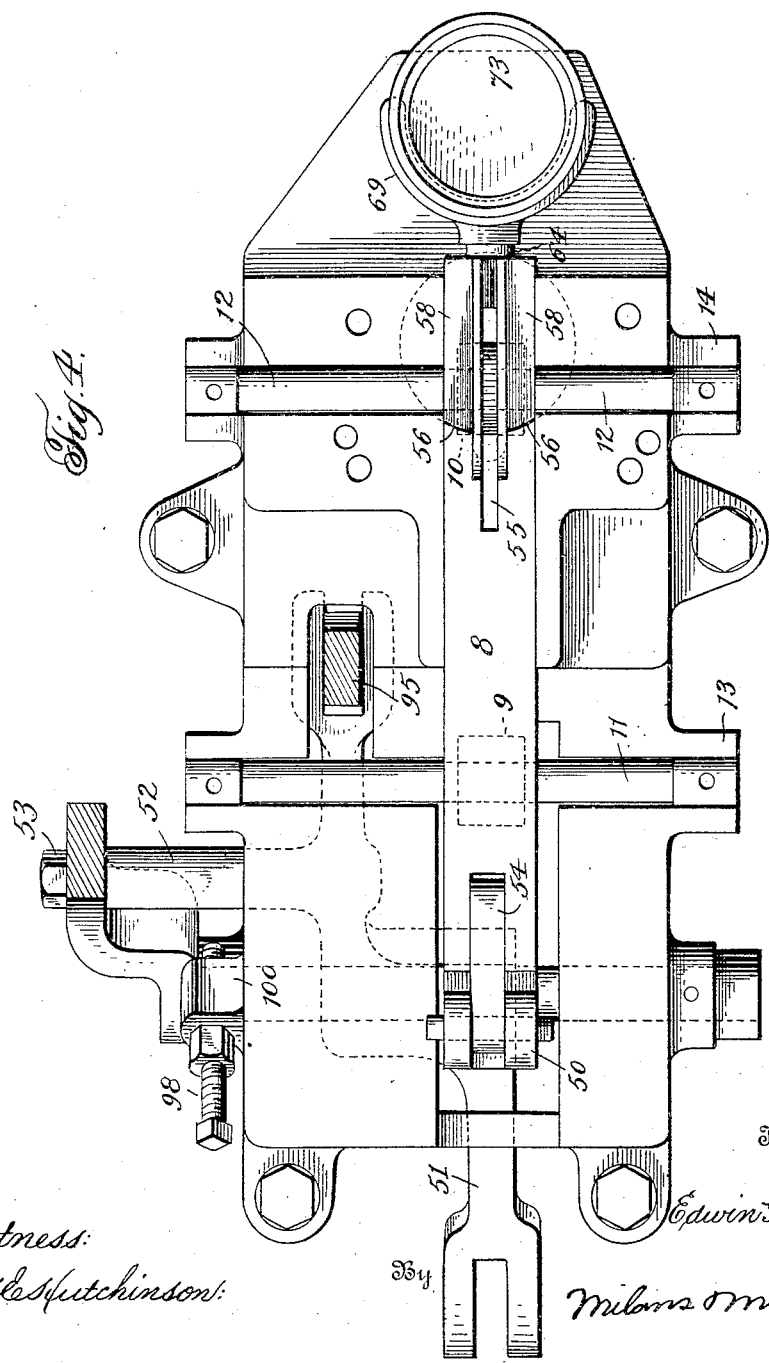

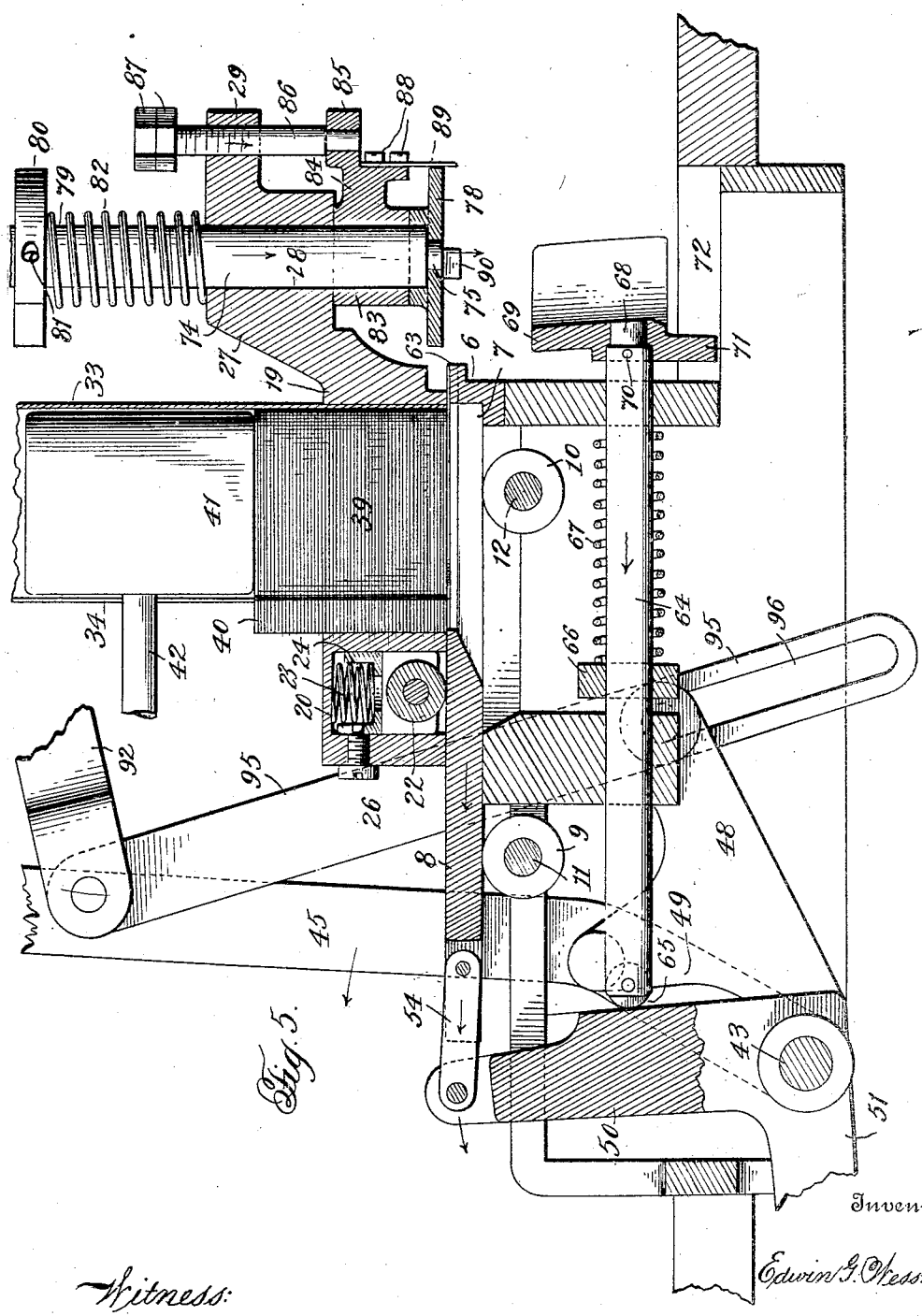

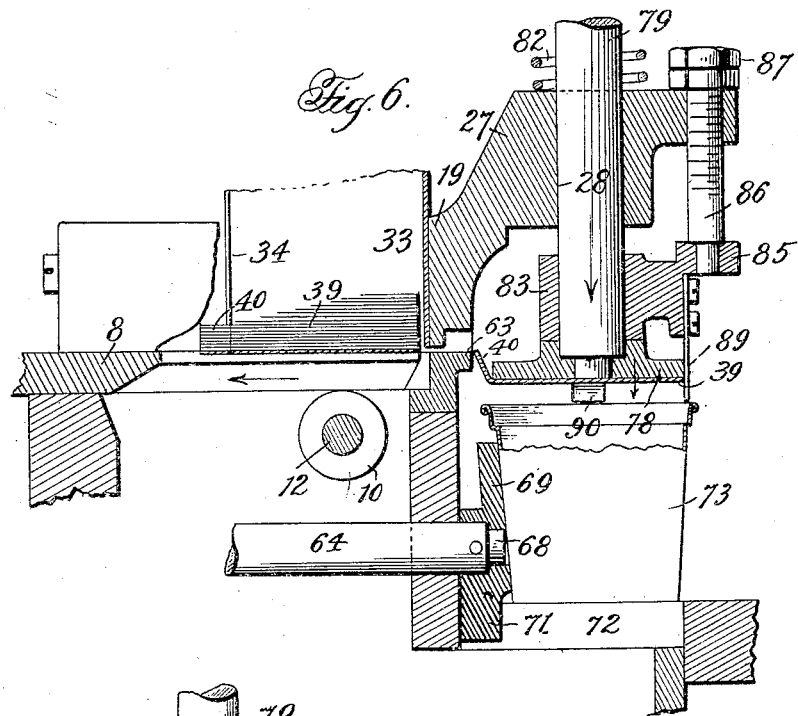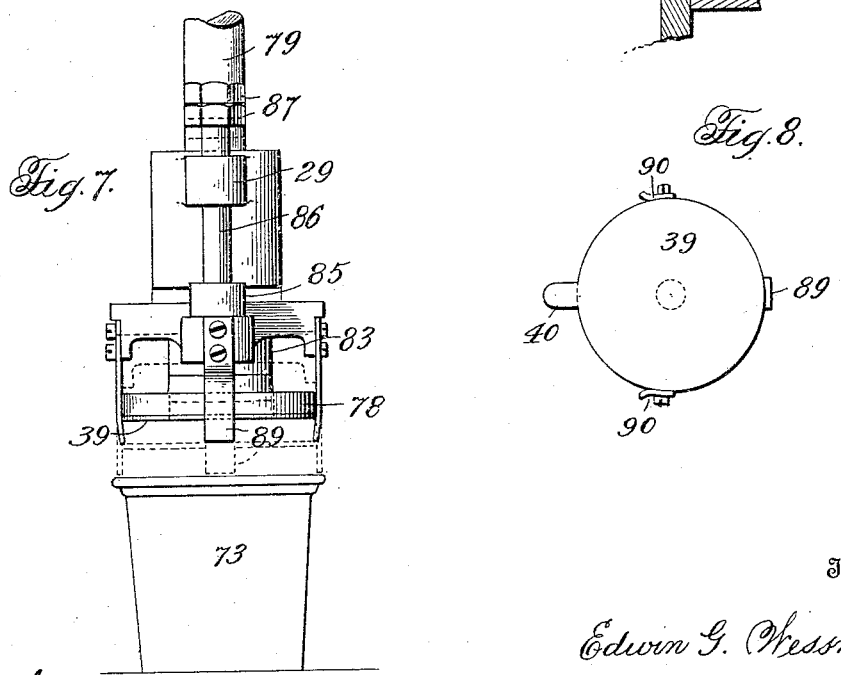

March 22, 1932.   E. G. WESSMAN   1,850,486
CAPPING MACHINE
Filed June 5, 1926   10 Sheets-Sheet 8

Witness:
Jas. E. Hutchinson

Inventor:
Edwin G. Wessman
By
Milans & Milans, Attorneys.

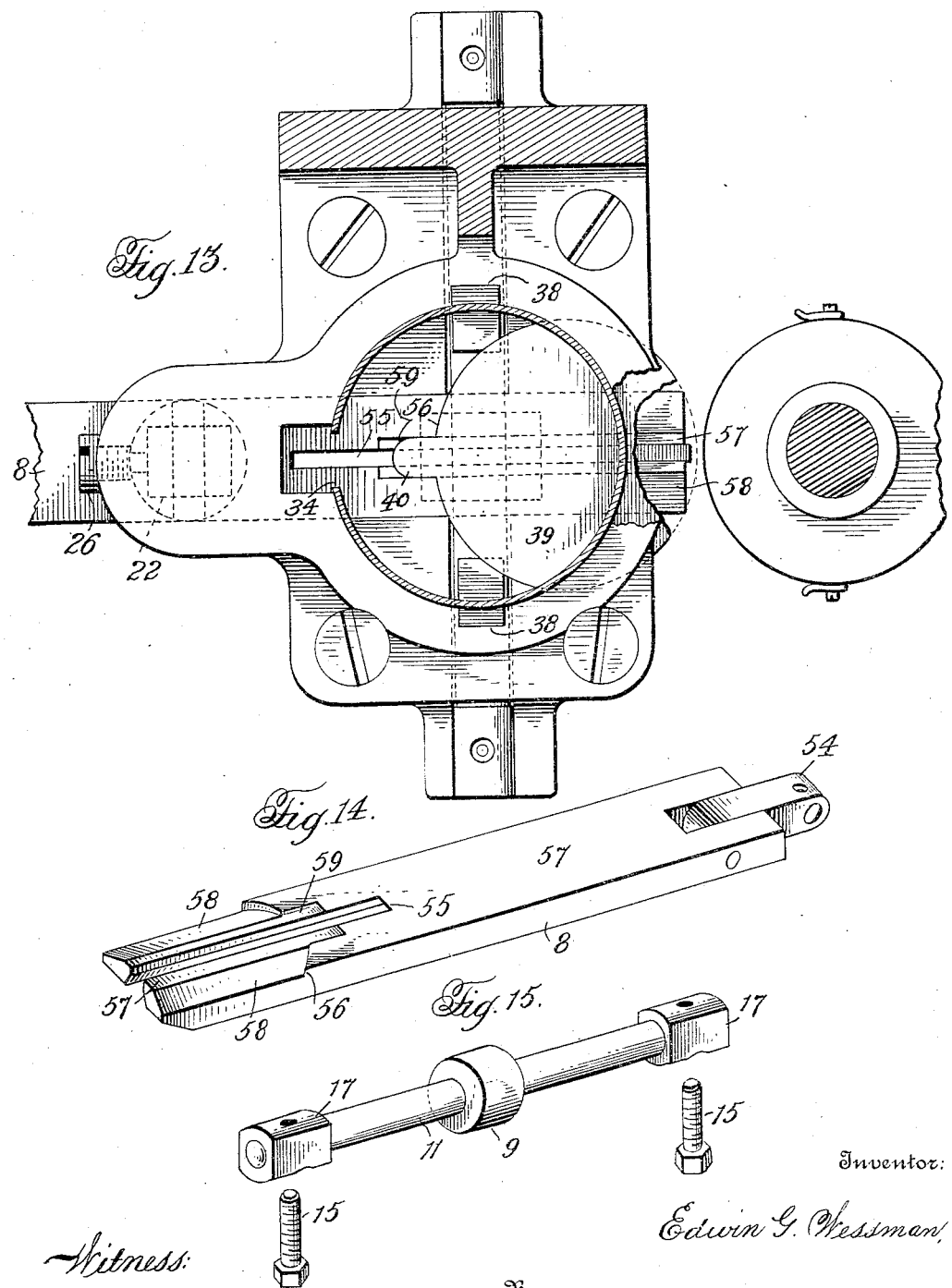

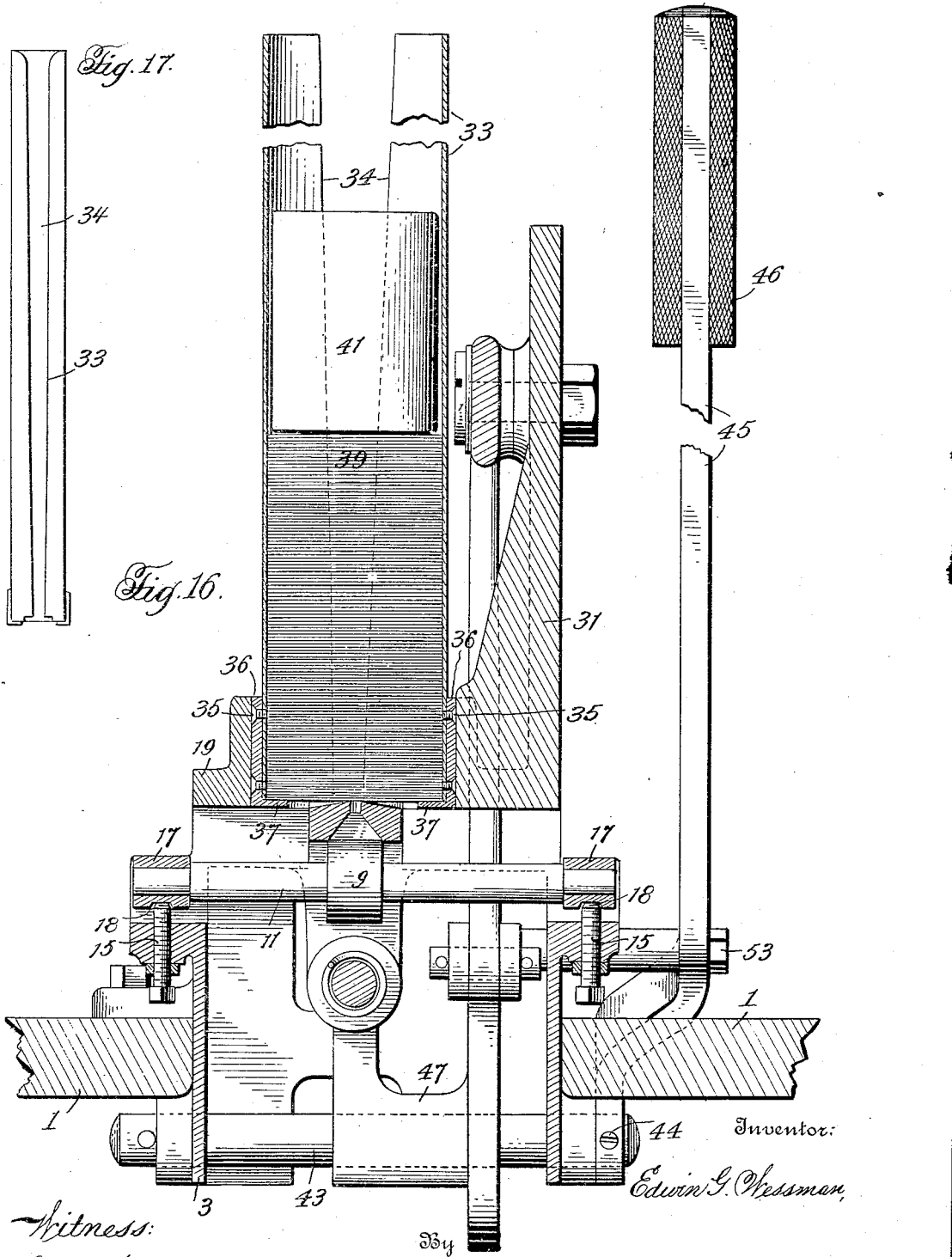

Patented Mar. 22, 1932

1,850,486

UNITED STATES PATENT OFFICE

EDWIN G. WESSMAN, OF EASTON, PENNSYLVANIA, ASSIGNOR TO INDIVIDUAL DRINKING CUP COMPANY, INC., OF EASTON, PENNSYLVANIA, A CORPORATION OF NEW YORK

CAPPING MACHINE

Application filed June 5, 1926. Serial No. 114,008.

My invention relates to new and useful improvements in capping machines and more particularly to a machine for placing disc caps into the open mouth of a paper receptacle although it will be undertsood that the machine might equally as well be used for applying the closure caps to receptacles of various designs and constructed of various materials.

The principal object of the invention resides in the provision of a machine of the character described which is relatively simple and inexpensive in construction and which while primarily intended for manual operation is so constructed that it may be operated from a foot treadle or from any suitable form of actuating machine.

Another object of the invention resides in the provision of a machine of the character described in which there is a container for holding a stack of the caps or closure discs and in which there is means for feeding a single cap or closure disc from the stack at a time and delivering the same into position relative to a reciprocating plunger so that when the plunger is operated the cap or closure disc will be carried into the open mouth of the receptacle and secured therein.

A further object of the invention consists in the provision of an ejector which, when the receptacle has been capped, ejects the receptacle from beneath the capping plunger to a position for removal by the operator of the machine, said ejector also acting as a positioning member when in its normal position for positioning the receptacle, to be capped, relative to the capping plunger said ejector and positioning member being preferably arcuate in shape allowing the receptacles to be easily engaged therewith or removed therefrom.

The caps or discs primarily intended for use in my machine are usually provided with a tab or projection which, when the cap or closure disc is in position extends substantially vertically or at right angles to the horizontal plane of the cap or disc whereby the same may be grasped for removing the cap or disc and I have as a still further object of the invention the provision of means whereby the tab or projection is initially bent from the horizontal plane of the cap or disc prior to its insertion into the open mouth of the receptacle.

It is another object of the invention to provide a machine of the character described having a novel form of sliding plunger or carrier for receiving a single cap or disc from the container holding a stack of the same, said sliding plunger being of such a formation as to allow for slight irregularities in the shapes of the caps or discs so that at all times but a single disc will be delivered from the container for positioning beneath the capping plunger.

It is a still further object of the invention to provide a novel form of member, cooperating with the capping plunger, for receiving the single cap or disc ejected from the container, said member having spring fingers or the like adapted for engaging the edge of the cap for positioning the cap beneath the capping plunger, the member having the spring fingers moving with the capping plunger for a predetermined distance but then being held against further movement allowing the capping plunger to continue its movement for releasing the cap or disc from the spring fingers to be delivered to and positioned within the open mouth of the receptacle.

As previously stated the caps or discs are usually provided with a tab or projection extending from the edge thereof and it is another object of my invention to provide a container or magazine having a vertically extending slot through which the caps or projections will extend, the edges of said slot being tapered inwardly from the top towards the bottom so that the tabs or projections of those discs or caps adjacent the bottom of the container or magazine will be in vertical alignment.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:—

Fig. 2 is a side elevation looking from the other side of the machine.

Fig. 3 is a top plan.

Fig. 4 is a top plan, the upper frame part with the plunger and link thereof being removed.

Fig. 5 is a longitudinal vertical section with parts shown in elevation.

Fig. 6 is a detail longitudinal section of the cap plunger, receptacle positioning and ejecting member, and cap magazine, the cap plunger and receptacle positioning and ejecting member being shown in their positions just prior to the insertion of a cap within the receptacle.

Fig. 7 is a detail front elevation of the cap plunger and cap holding or positioning member.

Fig. 8 is a detail showing a bottom plan of the cap plunger.

Fig. 13 is a detail horizontal section of the lower portion of the cap magazine, the cap ejecting slide or plunger being shown in plan and in normal position.

Fig. 14 is a detail perspective of the cap ejector or plunger.

Fig. 15 is a detail perspective of one of the supporting rolls and its bearings for the slidable cap ejector or plunger.

Fig. 16 is a transverse vertical section on the line 16—16 of Fig. 3 with parts shown in elevation, and Fig. 17 is an elevation showing in detail the cap container or magazine.

Figure 1:
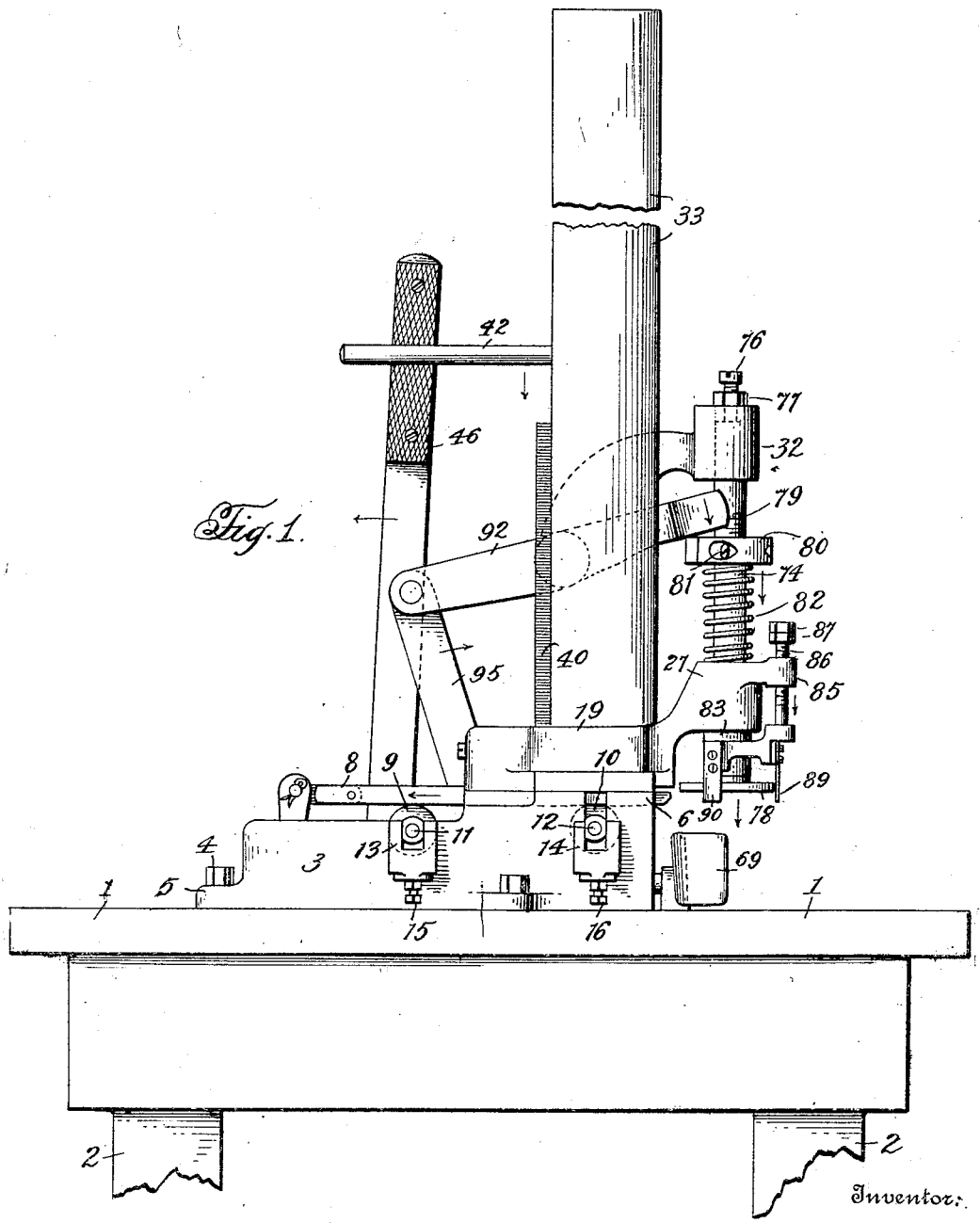
Fig. 1 is a side elevation of a machine constructed in accordance with my invention, looking from one side of the machine, the parts being shown in the normal positions.

In recent years paper cups have come into extensive use and while I will describe my machine for use in capping paper cups I wish it understood that the invention is not limited for such particular use but is equally well adapted for placing caps in receptacles of various shapes and sizes and constructed of various materials.

My improved form of capping machine may be supported upon any suitable object but in the drawings I have illustrated the same as supported upon a table including the top 1 and legs 2, the top 1 being provided with a suitable opening through which the bottom portion of the machine will extend and in which certain operating portions of the machine will be positioned.

The bottom or base portion of the machine is shown at 3 and is adapted to be secured to the top 1 of the table or other suitable support by means of the bolts 4 or other suitable fastenings which pass through the lugs 5 formed on the base or bottom. It will be understood that the base or bottom 3 passes through the opening formed in the top 1 as more particularly illustrated in Figs. 2 and 5 of the drawings. Adjacent the forward edge the base or bottom 3 is provided with the raised ledge 6 in which is formed the guideway 7 in which the cap or disc delivering slide or plunger 8 is adapted to operate. The plunger or slide 8 is mounted for reciprocating movement on the rollers 9 and 10 carried by the rods or shafts 11 and 12 respectively which have their outer ends reduced as shown more particularly in Fig. 16 to receive the sleeves which are received in the bearings 13 and 14 respectively, said rods or shafts being adapted for vertical adjustment by means of the screws 15 and 16 which pass through the bottoms of the bearings and engage the sleeves on the ends of the shafts as more particularly illustrated in Figs. 1, 2 and 16 of the drawings. The sleeves on the ends of the shafts are shown at 17 and as shown more particularly in Fig. 16 are provided with the recesses 18 in which the ends of the adjusting screws 15 and 16 are adapted to be received. The side faces of the sleeves are preferably flattened to engage the side walls of the bearings to prevent rotation of said sleeves in the bearings, it being understood that the ends of the shaft will be adapted for rotation in the sleeves.

Figure 12:
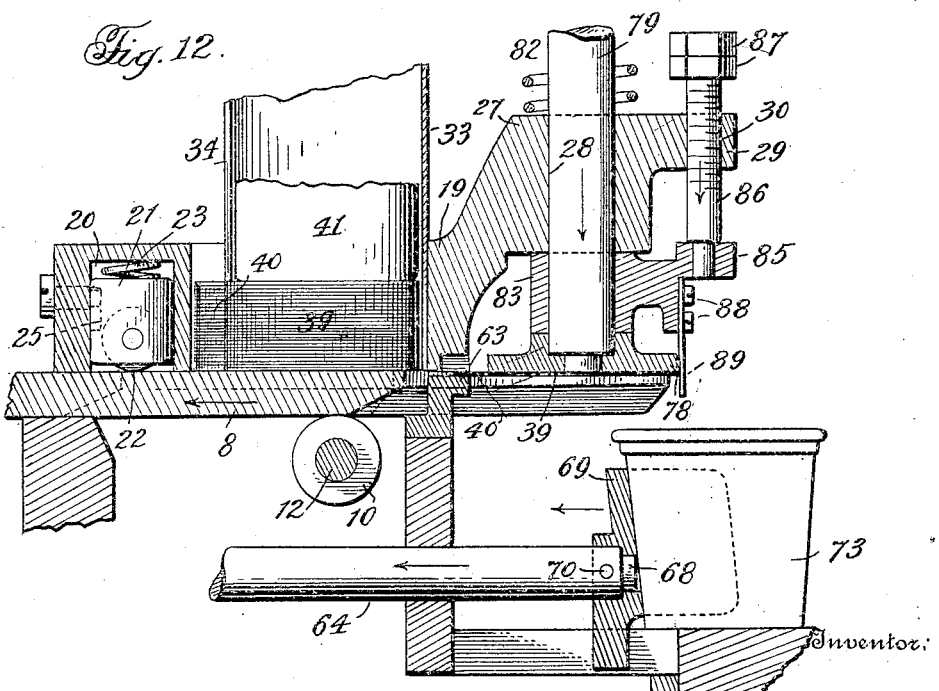
Fig. 12 is a fragmental longitudinal vertical section through the cap container, the cap plunger, and the cup positioning and ejector member, with parts shown in elevation, the parts being shown in their positions at the completion of a forward stroke of the operating lever.

Secured to the top of the ledge 6 of the base or bottom 3 by means of screws or other suitable fastenings is a casting 19 the bottom of the casting engaging the upper surface of the slide or plunger 8 as is quite clearly shown in the drawings. The casting 19 has the recess 20 formed from the bottom thereof and in this recess is slidably mounted the carriage 21 in which is rotatably mounted the roller 22 which engages the upper surface of the slide or plunger 8 as more particularly illustrated in Figs. 5 and 12. The carriage 21 is normally pressed downwardly to hold the roller 22 in engagement with the slide or plunger 8 by means of the coiled spring 23 which is mounted between the inner surface of the recess 20 and the top of the carriage, a recess 24 being formed in the top of the carriage to receive the lower end of the spring as more particularly illustrated in Fig. 5 of the drawings. An elongated recess 25 is formed in the wall of the carriage 21 as more particularly illustrated in Figs. 5 and 12 of the drawings, said elongated recess receiving the inner end of the screw 26. It will be noted that the screw 26 allows vertical movement of the carriage but prevents rotation thereof. The casting 19 is provided with the upwardly extending bearing portion 27 provided with the vertically extending opening 28 for a purpose to be later described and extending forwardly from the upwardly extending bearing portion 27 is a lug or projection 29 having the vertically extending opening 30 for a purpose to be later described. A standard 31 is formed on the casting 19 and extends upwardly therefrom as shown more particularly in Figs. 2 and 16 of the drawings. At the upper end this standard 31 is formed with the sleeve 32 for a purpose to be later described.

Supported by the casting 19 is the container or magazine 33, said container or magazine being in the form of a tube and having the vertically extending tapered slot 34, the edges of the slot tapering inwardly towards the lower end. Secured to the sides of the container or magazine, adjacent the lower end thereof, by means of the screws 35 or other suitable fastenings are the plates 36 which have at their lower ends the inwardly extending feet 37 overlying the inner diameter of the container or magazine at the lower end thereof as more particularly illustrated in Fig. 16. It will be understood that the lower end of the container or magazine 33 is received in an opening formed in the casting 19 and the plates 36 are received in vertically extending recesses 38 formed in the inner wall of the opening in which the end of the magazine or container extends. It will be seen that rotation of the container or magazine is prevented by the plates 36 being received in the recesses 38. Supported within the container or magazine, upon the feet 37 of the plates 36, is a stack of caps or discs 39 each of the caps or discs being provided with a tab or projection 40 as more particularly illustrated in Fig. 5 of the drawings. The tabs or projections 40 extend through the slot 34 formed in the container or magazine and said slot 34, forms a guide for the tabs 40. The slot 34 is somewhat wider at the top than the width of the tabs or projections but as the caps or discs move towards the bottom of the magazine or container they are aligned and held against rotatable movement as the lower end of the slot is of substantially the same width as the width of said tabs or projections. The purpose of aligning the tabs or projections will be later apparent. A weight 41 is received upon the stack of the caps or discs and holds the same close together and forces them towards the lower end of the magazine. A rod 42 extends horizontally from the side of the weight 41 and through the slot 34 formed in the magazine. By means of this rod the weight may be raised or removed from the magazine when desired for supplying new caps or discs to the magazine.

Rotatably mounted in the sides of the base 3, and extending transversely thereof, as more particularly illustrated in Fig. 16, is the shaft 43. This shaft is positioned adjacent the lower edge of the base and towards the rear end thereof. Secured to the shaft 43, adjacent one end thereof, by means of the screw 44 or other suitable fastening, is the lever 45 having the hand grip 46.

Loosely mounted upon the shaft 43, between the sides of the base 3, is a sleeve 47. At one end the sleeve 47 is formed with the forwardly and upwardly extending arm 48 and on the upper edge of this arm 48 is formed the projection 49. On the opposite end of the sleeve 47 is formed the substantially vertically extending arm 50 and the rearwardly extending substantially horizontal arm 51. Formed on the outer face of the projection 49 of the arm 48 is the horizontally extending pin 52, the outer end of which extends to a position adjacent the inner face of the lever 45. A screw or bolt 53 passes through the lever 45 and engages in the end of the pin 52 for securing the lever to the pin. It will thus be seen that as the lever 45 is operated it will rotate the sleeve 47 upon the shaft 43 and move the arms formed integral with the sleeve for operating certain parts in a manner to be later described.

One end of a link 54 is pivotally connected adjacent the upper end of the arm 50 and the opposite end is pivotally connected to the cap or disc plunger or slide 8. The detail construction of the plunger or slide 8 is more particularly illustrated in Fig. 14 of the drawings. A longitudinally extending slot 55 extends from the forward end of the slide or plunger 8 and the upper face of the slide or plunger, adjacent the forward end, is cut away to form the shoulders 56 on opposite sides of the slot, the flat portions 57 adjacent the edges of the slot, and the outwardly and downwardly beveled portions 58 extending from the flat portions 57 to the outer longitudinal edges of the slide or plunger. It will thus be seen that the ends of the shoulders 56 adjacent the outer longitudinal edges of the slide or plunger 8 will be of a greater height than the inner ends of said shoulders. The upper face of the slide or plunger is also cut away adjacent the shoulders 56 to form the recess 59, the bottom surface of said recess being longitudinally curved so that the outer end thereof will be on a plane with the flat portions 57 whereas the inner end will merge into the plane of the top surface of the slide or plunger. The reasons for this particular formation of the forward end of the slide or plunger will be later brought out.

Figure 11:
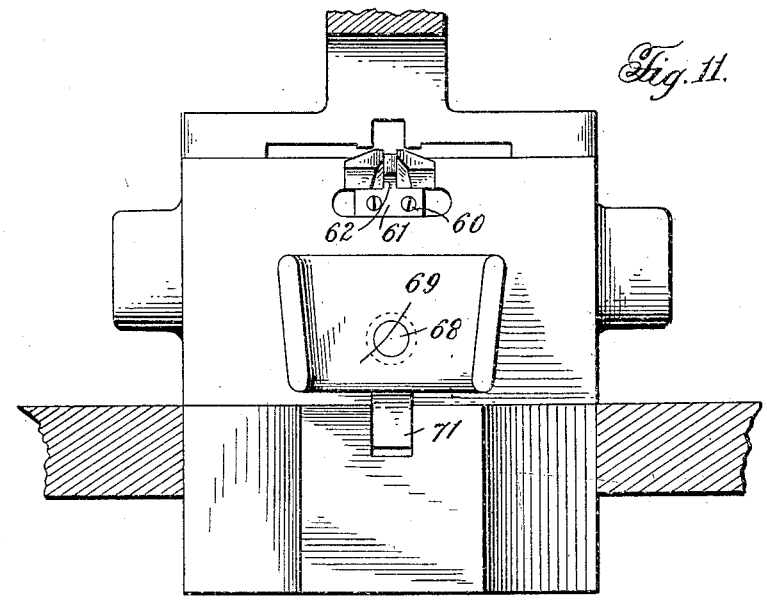
Fig. 11 is a fragmental detail showing a front elevation of the cup positioning and ejecting member as well as the slidable cap ejector or plunger.

Secured to the forward end of the base 3 by means of the screw 60 or other suitable fastenings is a plate 61 having the upwardly extending portion 62 of a width to be received within the longitudinally extending slot 55 of the slide or plunger 8. An outwardly extending lip or projection 63 is formed on the portion 62 for bending the tabs or projections 40 of the caps or discs in a manner to be later described. The manner of connecting the plates 60 to the forward face of the frame 3 is more particularly illustrated in Fig. 11 of the drawings and the manner in which the upwardly extending portion 62 and the lip or projection 63 operates in the slot 55 is more particularly illustrated in Figs. 5, 6 and 12 of the drawings. As shown more particularly in Fig. 12 the upper face of the lip or projection 63 is slightly below the upper face of the slide or plunger 8 and preferably on a plane with the flat portions 57 of the forward end of said slide or plunger. This arrangement will allow a cap or disc carried by the slide or plunger to pass over the upper face of the lip or projection 63 as is more particularly illustrated in Fig. 12 of the drawings.

Slidably mounted in the base 3 and extending longitudinally thereof is a rod 64. A roller 65 is rotatably mounted in the rear end of the rod 64 and is adapted to engage the forward vertical edge of the arm 50 formed on the sleeve 47. A collar 66 is secured to the rod, intermediate the ends thereof, and a coiled spring 67 surrounds the rod 64 between the outer face of the collar 66 and the inner face of the end of the base 3 as more particularly illustrated in Fig. 5 of the drawings. This coiled spring normally holds the rod in the position shown in Fig. 5 with the roller 65 in engagement with the face of the arm 50 as previously described and with the coiled spring slightly under tension. The forward or outer end of the rod 64 is reduced as shown at 68 and extends through an opening formed in an arcuate shaped plate 69 which is adapted to engage the receptacle to be capped and for ejecting the capped receptacle from position beneath the capping plunger to be later described. This plate 69 is secured to the end of the rod 64 by means of the transversely extending pin 70 and formed on the bottom surface of the plate 69 is the downwardly extending projection 71 which operates in a longitudinally extending opening 72 formed in the top of the base 3. The projection 71 operating in the opening 72 will prevent rotation of the shaft 64 and the plate 69 secured thereto. As is quite clearly illustrated in the drawings the outer face of the arcuate shaped plate 69 is vertically inclined so as to properly engage the tapered or inclined wall of the receptacle 73 which in the instance shown is in the form of a paper cup. The plate being arcuate in shape corresponds to the circumferential curve of the receptacle.

Extending through the vertically extending opening 28 in the upwardly extending bearing portion 27 of the casting 19 is a plunger rod 74 having its lower end reduced as shown at 75 and its upper end extending into the sleeve 32 formed on the upper end of the standard 31. The top of the sleeve 32 is closed with the exception of a threaded opening adapted to receive the screw 76 which is adapted for adjustment to regulate the limit of the upward movement of the plunger rod 74. A lock nut 77 is carried by the screw 76 and is adapted for holding the same in its adjusted positions. Secured on the lower end of the plunger rod 74 is the plunger head 78 preferably of a diameter equal to the diameter of the closure cap or disc. Intermediate the ends the plunger rod is threaded as shown at 79 and adjustable on this threaded portion is the collar 80, the collar being formed in two sections connected by the screws 81. Surrounding the plunger rod 74, between the bottom of the collar 80 and the top of the upwardly extending bearing portion 27 of the casting 19 is a coiled spring 82 which normally holds the plunger rod in its uppermost position.

When the plunger rod is in its uppermost position there is a space between the lower face of the upwardly extending bearing portion 27 of the casting 19 and the top of the plunger head 78. Surrounding the plunger rod between the lower face of the upwardly extending bearing portion 27 and the upper surface of the plunger head 78 is a sleeve 83 having the outwardly extending horizontal portion 84 formed with the perforated lug or projection 85. The sleeve 83 is slidable relative to the plunger rod 74 for a purpose which will later appear. Slidable through the vertical extending opening 30 of the lug or projection 29 formed on the upwardly extending bearing portion 27 of the casting 19 is a rod 86, the lower end of the rod being reduced and secured in the perforation of the lug 85. The upper end of the rod 86 is threaded to receive the nuts 87 one of which is adapted to act as a lock nut. When the sleeve 83 is in its uppermost position, with its upper end in engagement with the bottom face of the extension 27 of the casting 19 the lowermost of the nuts 87 will be positioned above the upper face of the lug or projection 29. Secured to the outwardly extending horizontal portion 84 of the sleeve 83, by means of the screws 88 or other suitable fastenings, is a spring finger 89, and secured on opposite sides of the sleeve 83 are the spring fingers 90, these spring fingers 89 and 90 being straight. Preferably the fingers 90 will be positioned slightly rearward of the longitudinal center of the plunger rod 74. The spring fingers 90 will be secured to the sleeve 83 by means of screws or other suitable fastenings. When the plunger rod 84 and its head 78 are in their uppermost positions the lower ends of the spring fingers 89 and 90 will extend below the bottom face of the plunger head 78 as more particularly illustrated in Fig. 5 of the drawings. The spring fingers are adapted to engage the peripheral edge of a cap or disc 39 and hold the same relative to the plunger head 78, the spring finger 89 limiting the forward movement of the cap or disc relative to the plunger head.

Pivotally connected to the standard 31, at 91, is a lever 92, the forward end of said lever being forked as shown at 93 to receive the plunger rod 74 and to bear upon the upper face of the collar 80 carried by the plunger rod. Pivotally connected at 94 to the rear end of the lever 92 is a bar 95 having adjacent its lower end the elongated opening 96. Operating in the elongated opening 96 is a transversely extending pin 97 carried by the forward end of the arm 48 formed on the sleeve 47 carried by the transversely extending shaft or rod 43. When the parts are in their normal position the pin 97 is positioned at the upper end of the opening 96. The forward end of the arm 48 is formed to straddle the bar 95.

For limiting the movement of the operating lever 45 in either direction I provide the adjustable screws 97 and 98 which are adjustable through the interiorly threaded lugs 99 and 100 respectively formed on the sides of the base 3. The screws are adapted to be held in their adjusted positions by means of the lock nuts 101 and 102 respectively. As shown more particularly in Fig. 2 of the drawings the inner ends of the screws will engage the pin 52 connected to the lever for limiting the movement of the lever. The pin 52 which connects the lever 45 to the extension 49 of the arm 48 operates through an arcuate shaped elongated opening 103 formed in the side of the base 3 as is more particularly illustrated in Fig. 2 of the drawings. While my machine is adapted normally to be manually operated through manipulation of the lever 45 at times it might be desirable to operate from a foot treadle or by machinery. In order that this might be done, when desired, the rearwardly extending substantially horizontal arm 51 formed on the sleeve 47 is provided, adjacent its outer end, with an opening 104 through which the treadle means or machine operating means might be connected.

Figure 9:
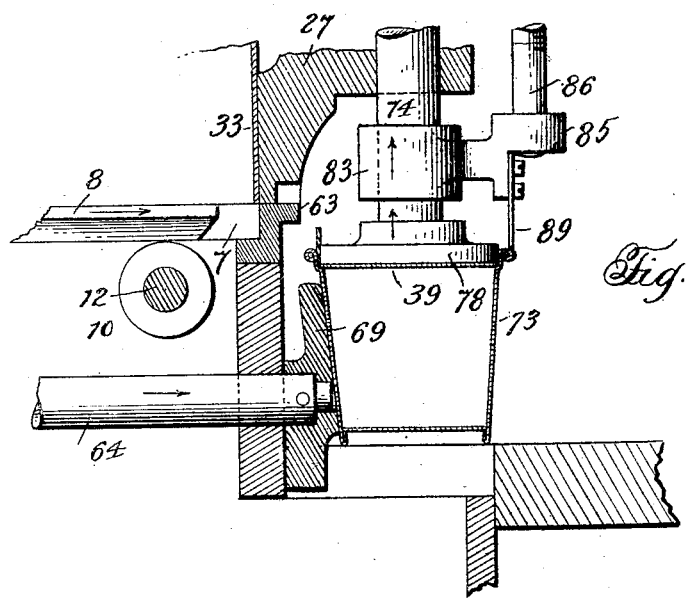
Fig. 9 is a detail longitudinal vertical section showing the cap plunger and receptacle positioning and ejecting member in their positions in the completion of the operation of inserting a cap within a receptacle.
Figure 10:
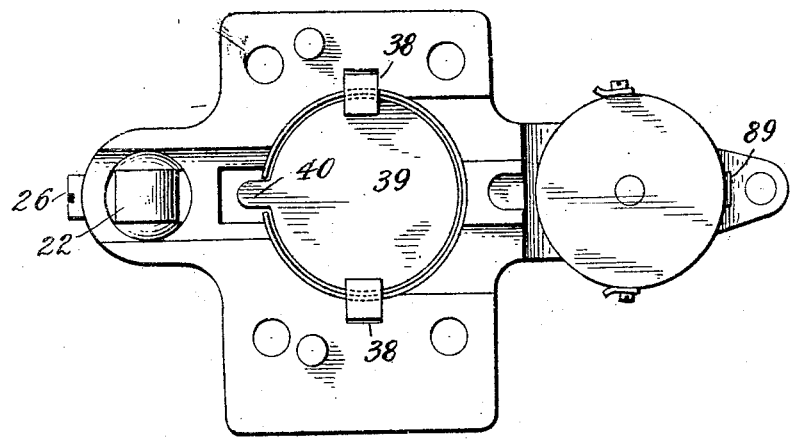
Fig. 10 is a detail showing a bottom plan of the upper part of the frame with the cap plunger and cap container or magazine.

Having fully described the detail construction of my improved machine I will now endeavor to more clearly bring out the operation thereof. The parts of the machine are illustrated in their normal positions in Figs. 1, 2, 3, 4, 5 and 16 of the drawings. A stack or pile of the caps or discs 39 are placed within the container or magazine 33 by removing the weight 41, the caps or discs being inserted from the top of the container or magazine with their tabs or projections 40 extending through the slot or opening 34. As has been described the edges of the slot 34 are directed inwardly from the top towards the bottom and therefore as the caps or discs in the stack reach the lowermost position of the container or magazine the tabs or projections are aligned for a purpose which will be later apparent. After the container or magazine has been filled with the caps or discs the weight will be returned to its position within the magazine or container, resting upon the top of the stack and the handle or rod 42 projecting through the slot 34. To initially start operating the container may be bodily removed when desired by removing the lower end from its receiving opening and the caps or discs will be held by the inwardly extending feet 37. When the cap or disc is to be placed in the open end of a receptacle the operator will grasp the grip 46 of the hand lever 45 and push the same rearwardly. The hand lever 45 being connected to the arm 48 by the pin 52 will swing the arm 48 upwardly and rotate the sleeve 47 on the shaft 43, this action also drawing the arm 50 rearwardly as shown by the arrow in Fig. 5 and through the link connection 54 drawing the slide or plunger 8 rearwardly so that the lowermost cap or disc in the magazine or container will drop in position in front of the shoulders 56, it being understood that preferably the lowermost cap or disc has been supported upon the upper surface of the slide or plunger 8. When the cap or disc drops in front of the shoulders 56 the tab or projection 40 thereof will be received in the recess 59. After the cap or disc has been received in front of the shoulders 56 the hand lever 45 is returned to its original position to extend substantially vertical. When in this position the disc or cap will be shown in the position as disclosed more clearly in Fig. 13 of the drawings. At this point I wish to lay particular stress on the advantage of having the forward end of the slide or plunger 8 with the tapering edges 58. It can readily be appreciated that at times the discs or caps might not be perfectly flat or in other words on a level plane but might have warped a little so that the side edges thereof extend a little below the central portion which is supported upon the upper surface of the slide. If the forward edge of the slide or plunger were perfectly level it can be appreciated that the cap might not be properly engaged by the shoulders 56 to allow the cap to be ejected from the stack but with the beveled edges 58 the cap will always be properly engaged to be ejected. With the lever back in its original or substantially vertical position the operator then draws the same forwardly and this movement will cause the arm 50 to swing forwardly and through the link connection 50 push the slide or plunger 8 forwardly and carry the cap or disc to position beneath the plunger head 78 where it is held by the spring fingers 89 and 90. This forward movement of the arm 50 will force the rod 64 forwardly and carry with it the plate 69, at the same time putting the spring 67 under tension. When the parts have reached their forwardmost position the lever will be returned to its normal position and the spring 67 will expand and force the rod 64 rearwardly to its normal position with the roller 65 engaging the forward vertical edge of the arm 50. When the plate 69 is forward the operator will place a cup or other receptacle 73 in front thereof and in engagement therewith and as the rod and plate move rearwardly the operator keeps the receptacle in contact with the plate with his or her hand. With these movements completed there is a cap in position on the plunger head 78 and a receptacle positioned therebeneath. The cup or receptacle is placed in position with its bottom resting on the top of the base 3 and with its wall engaging the plate 69. The plate 69 acts as a guide for properly positioning the cup or receptacle beneath the capping plunger. With the cup or receptacle in position I am now ready for the capping. By again pushing the lever 45 rearwardly the slide or plunger 8 is drawn rearwardly as previously described and as the arm 48 is raised it raises the bar 95 as the transversely extending pin 97 is engaged with the upper end of the elongated opening 96. This upward movement of the bar 95 raises the rear end of the lever 92 and swings the lever on the pivot 91 to lower the forked end 93. As the forked end 93 engages the upper surface of the collar 80 it lowers the plunger rod 74 with its head 78 and places the coiled spring 82 under tension or compression. As the plunger head 78 is lowered the sleeve 83 is correspondingly lowered, due to its weight, and carries with it the cap or disc which is positioned beneath the plunger head 78 and held by the spring fingers 89 and 90. The sleeve 83 is lowered until the nuts 87 on the rod 86 engage the upper surface of the portion 27 and when this occurs the sleeve 83 is held in the position more particularly shown in Fig. 6. However, the downward movement of the plunger rod 74 continues and this movement carries with it the cap or disc and allows the cap or disc to be positioned in the open end of the cup or other receptacle as shown more particularly in Fig. 9. The spring fingers 89 and 90 are of such a length as to terminate above the upper edge of the receptacle when in their lowermost position. When the lever 45 is moved rearwardly in the capping operation the arm 50 moves rearwardly and this allows the rod 64 to move slightly towards the rear. The operator pushes the receptacle rearwardly with the plate 69 to be in vertical alignment with the plunger head 78 and holds the receptacle while the cap is being inserted. Normally the rear face of the plate 69 is spaced from the base as shown more particularly in Fig. 5 and this prevents accumulation of material from interfering with the operation. As the cap or disc is being lowered the tab or projection 40 thereon is bent upwardly before being inserted into the open end of the receptacle. This is done by the tab or projection engaging with the lip 63 formed on the plate 61. Before the capping plunger head 78 is lowered the tab or projection will overlie the lip as shown more particularly in Fig. 12 of the drawings and when the plunger head starts downwardly the tab or projection will be bent upwardly in the manner shown more particularly in Fig. 6. With the cap or disc in position in the cup the lever 45 is drawn forwardly and this movement lowers the arm 48, allows the bar 95 to drop and the outer forked end 93 of the lever 92 to be raised it being understood that the coiled spring 82 will expand and raise the collar 80 with the plunger rod 74, the plunger head 78 and the sleeve 83. The continued forward movement of the lever 45 will again carry the slide or plunger 8 forwardly with a cap or disc and position the same beneath the plunger head 78. At the same time the forward movement of the lever 45 carries the rod 64 forwardly, in the manner previously described, and the forward movement of the plate 69 carries with it the cup or receptacle and ejects the same from position beneath the plunger head 78 and in such a position that it may be readily removed by the operator. The lever is then again turned rearwardly and the operation will continue as has been described. The slide 8 operates on the rollers 9 and 10 and is held in downward position in contact therewith by means of the roller 22. The slot 55 in the forward end of the slide 8 allows the slide to be moved forwardly without interference by the extension 62 or lip 63 on the plate 61.

From the above it will be seen that I have provided a novel form of machine for capping paper or other receptacles. The construction is relatively simple and by manipulating the hand lever or disc or cap is fed from a magazine or other container into position beneath a plunger where it is held until the plunger is lowered to position the same within the receptacle. The cap is held in a novel manner and as the plunger is lowered the tab or projection on the cap or disc will be bent upwardly so as not to interfere with the proper positioning of the cap within the receptacle. It can readily be appreciated that if the tab or projection was not bent it might interfere with proper positioning of the cap within the receptacle for it would then be necessary to allow for the upper edge of the receptacle engaging with the tab or projection to bend the same upwardly as the cap was being forced into the receptacle. After once started the operation is continuous by a backward and forward manipulation of the operating lever and as a cap or disc is being fed forwardly to position beneath the plunger the receptacle which has already been capped is being ejected to a position whereby the operator may easily remove the same.

Having fully described my invention what I claim as new and desire to secure by Letters Patent is:

1. A machine of the character described for capping receptacles including a container for a plurality of caps, a plunger for placing a cap in the receptacle, and a slide for feeding a cap from the container to the plunger, said slide having a shoulder adapted for engaging the edge of the cap and the longitudinal edges of the slide in front of the shoulder being outwardly and downwardly inclined.

2. A machine of the character described for capping receptacles including a container for a plurality of caps, a plunger for placing a cap in the receptacle, and a slide for feeding a cap from the container to the plunger, said slide having a shoulder adapted for engaging the edge of the cap and that portion of the slide in front of the shoulder being on a higher plane adjacent the longitudinal center of the slide than adjacent the longitudinal edges thereof.

3. A machine of the character described for capping receptacles including a container for a plurality of caps, a plunger for placing a cap in the receptacle, supporting rollers, a slidable member operable upon the supporting rollers and positioned relative to the cap container for feeding a cap from the container to the plunger, and a yieldable member engageable with the upper surface of the slidable member.

4. A machine of the character described for capping receptacles including a container for a plurality of caps, a plunger for placing a cap in the receptacle, supporting rollers, a slidable member operable upon the supporting rollers and positioned relative to the cap container for feeding a cap from the container to the plunger, and a spring controlled roller engageable with the upper surface of the slidable member.

5. A machine of the character described for capping receptacles including a container for a plurality of caps, each of said caps having a tab formed thereon, a plunger for placing a cap in the receptacle, means for feeding a cap to the plunger, means for operating the plunger for positioning the cap in the receptacle, and means for bending the tab of the cap prior to its positioning in the receptacle.

6. A machine of the character described for capping receptacles including a container for a plurality of caps, each of said caps having a horizontally extending tab formed thereon, a plunger for placing a cap in the receptacle, means for feeding a cap from the container to the plunger, means for operating the plunger to place the cap in the receptacle, and means for bending the tab of the cap prior to positioning of the cap within the receptacle.

7. A machine of the character described for capping receptacles including a container for a plurality of caps, each of said caps having a horizontally extending tab formed thereon, a plunger for placing a cap in the receptacle, means for feeding a cap from the container to the plunger, means for operating the plunger to place the cap in the receptacle, and means for bending the tab of the cap during the movement of the plunger and prior to its positioning within the receptacle.

8. A machine of the character described for capping receptacles including a container for a plurality of caps, each of said caps having a horizontally extending tab formed thereon, a plunger for positioning the cap in the receptacle, means for feeding a cap from the container to the plunger, means for operating the plunger to place the cap in the receptacle, and means underlying the tab for bending the same upon operation of the plunger and prior to its positioning in the receptacle.

9. A machine of the character described for capping receptacles including a container having a tapered vertically extending slot therein through which the tabs of caps supported in the container extend, said tapered slot aligning the tabs on the caps adjacent the lower end of the container, a plunger for placing a cap in the receptacle, means for feeding a cap from the container to the plunger, means for operating the plunger, and means for bending the tab of the cap prior to its insertion in the receptacle.

10. A machine of the character described for capping receptacles including a container for a plurality of caps, a member for inserting the cap into the receptacle, and means including a single lever operated successively in opposite directions to successively feed a cap from the container to the cap inserting member, operate the cap inserting member, and eject the capped receptacle from beneath the cap inserting member.

11. A machine of the character described including a container for a stack of caps, a plunger for placing a cap in a receptacle positioned relative thereto, a slide for receiving a cap from the container and positioning the same relative to the plunger, a lever, and means whereby when the lever is moved in one direction it will operate the plunger in a cap placing movement and to position the slide to receive a cap and when moved in the opposite direction will operate the slide to position the cap relative to the plunger and to eject the capped receptacle from position relative to the plunger.

12. A machine of the character described for capping receptacles including a container for a plurality of caps, a bearing member positioned relative to the container, a plunger rod operable through the bearing and provided on its end with a head for placing a cap in the receptacle, a cap receiving member normally supported by the plunger head and operable therewith, a rod carried by the cap receiving member and operable through the bearing member for limiting the downward movement of the cap receiving member, means for feeding a cap from the container to the cap receiving member, and means for operating the plunger rod, the cap receiving member moving downwardly with the plunger head by gravity for a portion of its movement and raised upon upward movement of the plunger head by engagement therewith.

13. A machine of the character described for capping receptacles including a container for a plurality of caps, a bearing member positioned relative to the container, a plunger rod operable through the bearing and provided on its end with a head for placing a cap in the receptacle, a cap receiving member normally supported by the plunger head and operable therewith, a rod carried by the cap receiving member and operable through the bearing, adjustable means carried by the rod for limiting the downward movement of the cap receiving member, means for feeding a cap from the container to the cap receiving member, and means for operating the plunger rod, the cap receiving member moving downward with the plunger head by gravity for a portion of its movement and raised upon upward movement of the plunger head by engagement therewith.

In testimony whereof I hereunto affix my signature.

EDWIN G. WESSMAN.